P. N. JONES AND J. W. WELSH.
CONTROL OF ELECTRIC MOTORS.
APPLICATION FILED DEC. 17, 1915.
1,312,183.
Patented Aug. 5, 1919.
3 SHEETS—SHEET 1.
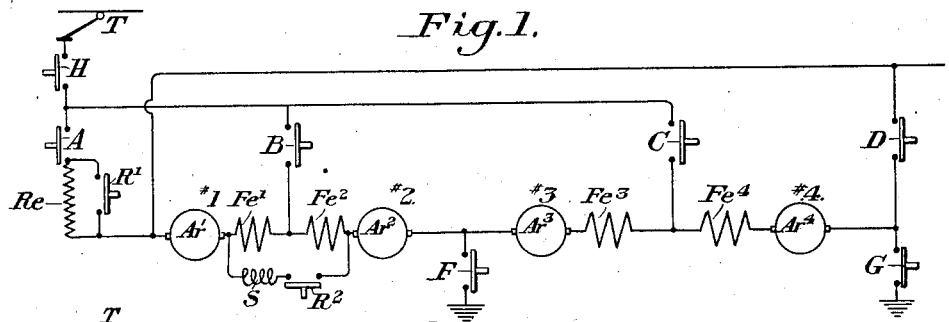
Fig. 1.
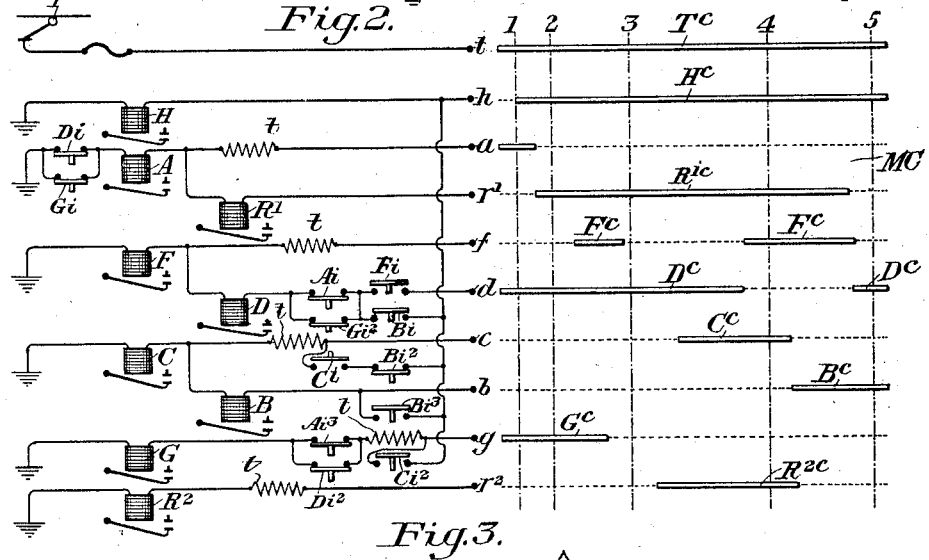
Fig. 2.
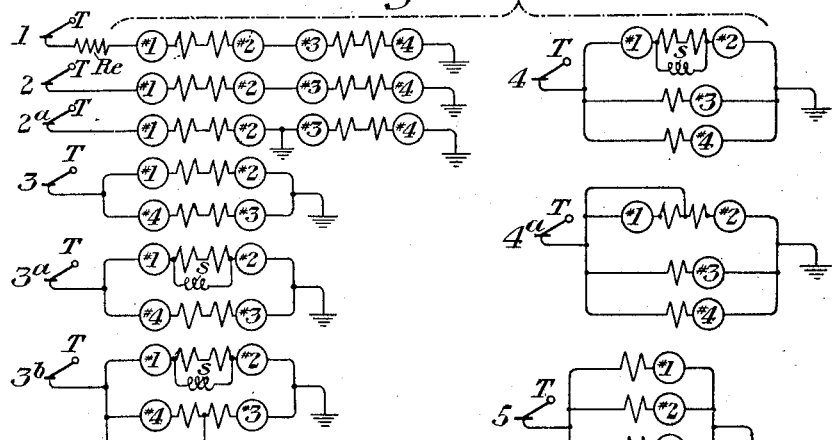
Fig. 3.
Fig. 3a.
WITNESSES
INVENTORS
P. N. Jones
J. W. Welsh P. N. JONES AND J. W. WELSH.
CONTROL OF ELECTRIC MOTORS.
APPLICATION FILED DEC. 17, 1915.

1,312,183.

Patented Aug. 5, 1919.
3 SHEETS—SHEET 2.

WITNESSES
R. A. Balderson
J. B. Fleming

INVENTORS
P. N. Jones
J. W. Welsh
by Bakewell, Byrnes, Parmelee
Attys.

P. N. JONES AND J. W. WELSH.
CONTROL OF ELECTRIC MOTORS.
APPLICATION FILED DEC. 17, 1915.
1,312,183.
Patented Aug. 5, 1919.
3 SHEETS—SHEET 3.
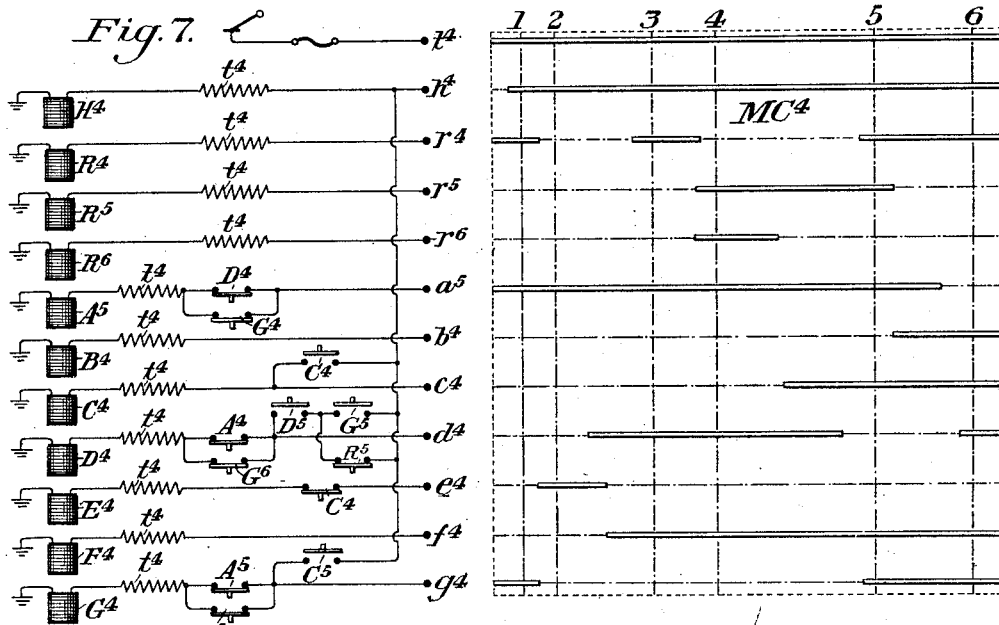
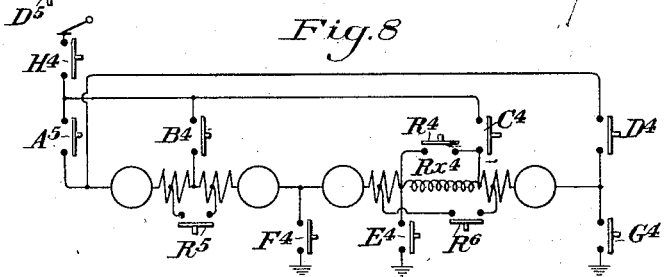
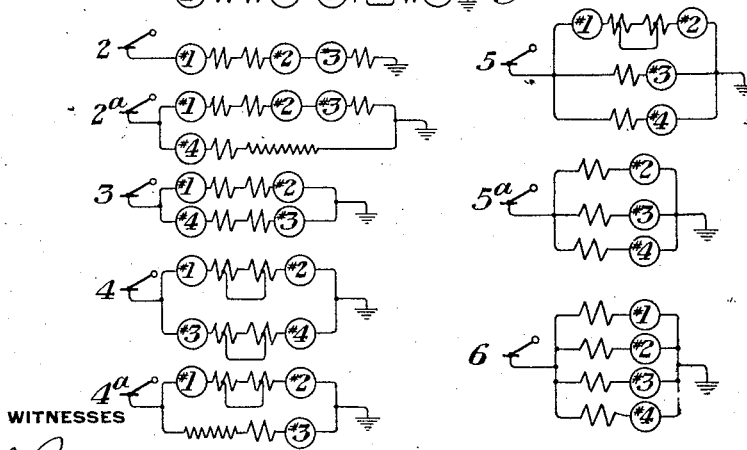
WITNESSES
INVENTORS

UNITED STATES PATENT OFFICE.

PEARL N. JONES, OF PITTSBURGH, AND JAMES W. WELSH, OF OAKMONT, PENNSYLVANIA.

CONTROL OF ELECTRIC MOTORS.

1,312,183.   Specification of Letters Patent.   Patented Aug. 5, 1919.

Application filed December 17, 1915. Serial 67,303.

*To all whom it may concern:*

Be it known that we, PEARL N. JONES and JAMES W. WELSH, both citizens of the United States, residing, respectively, at Pittsburgh and at Oakmont, Allegheny county, Pennsylvania, have invented a new and useful Improvement in Controls of Electric Motors, of which the following is a full, clear, and exact description, reference being had to the accompanying drawings, forming part of this specification, in which—

Figure 1 is a wiring diagram of the power circuits arranged for carrying out one form of our invention;

Fig. 2 is a diagram showing a development of the master controller;

Fig. 3 is a diagram illustrating the motor connections and relations in the different positions of the master controller indicated in Fig. 2;

Figure 4:
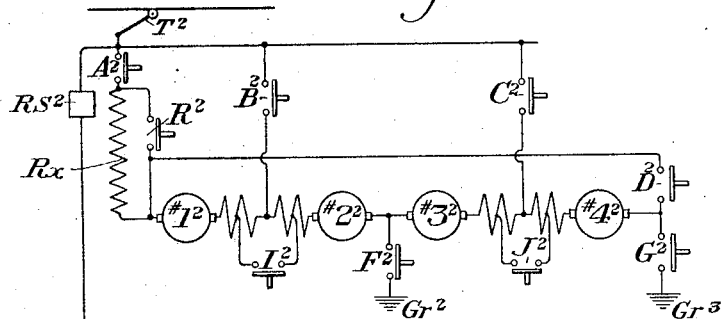
Figure 4:
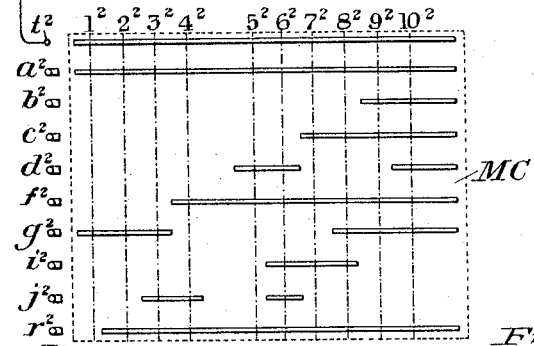
Figure 5:
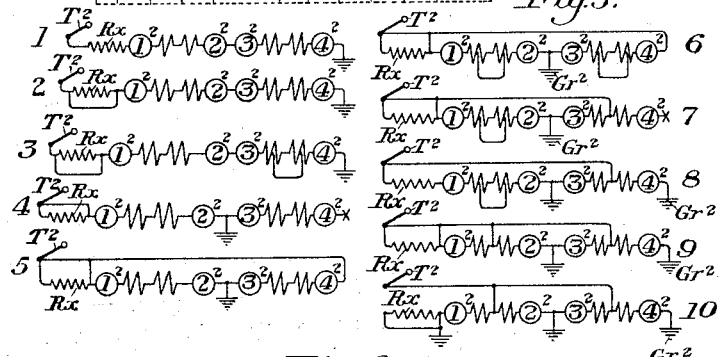
Figure 6:
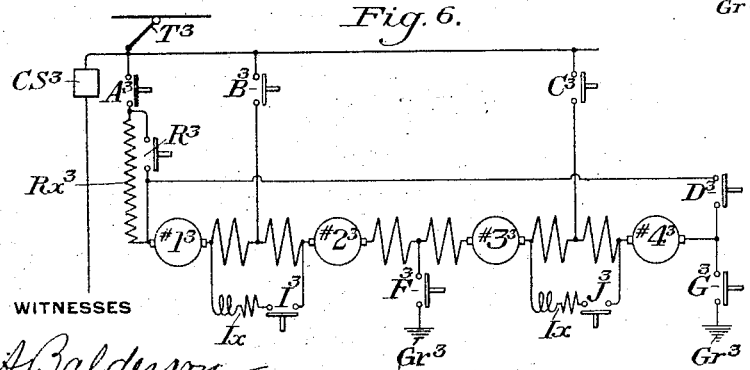

Fig. 3$^a$ is a diagram illustrating another method of weakening the fields;

Fig. 4 is a view similar to Fig. 1, showing a modification of the invention and also showing a development of a modified master controller in connection therewith;

Fig. 5 is a view similar to Fig. 3, but showing the connections and relations effected by the arrangement illustrated in Fig. 4;

Fig. 6 is a view similar to Fig. 1, but showing another modification;

Fig. 7 is a view similar to Fig. 2, but showing another modification;

Fig. 8 is a view similar to Fig. 1, and showing the power circuits employed in connection with the arrangement of Fig. 7; and Fig. 9 is a view similar to Fig. 3, and showing the motor connection and relations in the different portions of the master controller shown in Fig. 7.

Our invention has relation to the control of electric motors, and is designed to provide a means of and method for the control of a plurality of electric motors by which the changes from series to series parallel relation or from series parallel to full parallel relation, one or both, are effected in a novel and efficient manner.

A further object of the invention relates to prolonging the period during which certain motors are short-circuited in their acceleration from partial voltage to full voltage, whereby during the short-circuited interval, the current in the short-circuited motor or motors is given time to die down, and thus eliminates arcing at the contacts of the switching devices when such motor or motors is subsequently open-circuited.

Our invention is particularly adapted for use in connection with or as an improvement upon the system of control which is described and claimed in our Patent No. 1,109,338, dated September 1, 1914, although in some of its broader features, it is not limited thereto.

Referring first to that form of our invention illustrated in Figs. 1, 2 and 3, we have shown four electric motors marked, respectively, Nos. 1, 2, 3, and 4. The armatures of these motors are designated, respectively, $Ar'$, $Ar^2$, $Ar^3$, $Ar^4$ and the field windings $Fe'$, $Fe^2$, $Fe^3$, $Fe^4$. The four motors are shown as having permanent series connections in the manner described and claimed in the Letters Patent above referred to. T, wherever seen, designates the trolley or supply connection, and A, B, C, D, F, G, H, R′, R² designate the contactors or actuators by means of which the power circuits of the motors are controlled. The movable elements of these contactors may be actuated in any suitable manner. In the forms of our invention illustrated herein, they are actuated by means of solenoid coils, whose circuits are controlled by a master controller MC. The ground connections for the several circuits are illustrated in the conventional manner.

The different running positions of the master controller MC are indicated by the dotted vertical lines in Fig. 2, and the corresponding motor connections and relations are indicated diagrammatically in Fig. 3. For convenience, the relatively fixed contacts of the master controller are given lower case reference letters which correspond to the various contactors which they temporarily control. In this manner, the open or closed positions at each contactor in any position of the master controller can be readily seen by comparison of Figs. 1, 2 and 3.

R$e$ designates external resistance which, in the arrangement shown, is only in circuit in the first running position of the master controller. One of the objects of our invention in its preferred form is to obviate as far as possible the use of external resistance in the acceleration steps.

The contactors are provided with a system of interlocks substantially as in our patent above referred to, although somewhat different in their detail arrangement. The precise arrangement of these interlocks forms no part of our present invention, and a general description thereof will therefore suffice. $Di$ and $Gi$ are two interlocking contacts, which are controlled, respectively, by the coils of the actuators D and G, the two contacts being placed in parallel with each other and in series with the winding of the contactors A and R'. The purpose of these two interlocks is to make it impossible for the contactor A to be energized if both contactors D and G are energized.

$Ai$ and $Gi^2$ are contactors placed in parallel with each other and in series with the windings of armatures D and F. Their purpose is to make it impossible for the actuator D to be energized when both contactors A and G are energized, these contactors $Ai$ and $Gi^2$ being respectively actuated by the contactors A and G. $Ai^3$ and $Di^2$ are two other interlocking contacts, which are actuated respectively by the contactors A and D, and which are placed in series with the contactor G to make it impossible for said contactor G to be energized if both A and D are energized.

$Fi$, $Bi$, $Bi^2$, $Bi^3$, $Ci$, $Ci^2$ represent sets of interlocking contacts, actuated, respectively, by the actuators F, B and C, and they are for the purpose, during the return movement of the master controller, of maintaining whatever arrangement of circuits exists at the instant of starting to throw the controller off until the off position is reached, without establishing any new circuits. This is generally illustrated in our patent above referred to, and is for the purpose of minimizing the number of operations of the actuators with the resulting wear and tear, and also of decreasing the arcing as the circuits are opened; the several circuits being held closed until the off position is reached. They are then opened with much less destructive arcing.

$t$, wherever seen, designates resistance elements in the control circuits. It will be noted that several of the actuator windings are at times connected in series with each other, whereas at other times, one of these windings only will be in circuit. The resistance elements $t$ are effective under the latter conditions to take the place of the other actuator winding, and thus reduce the voltage across the terminals of the actuator coil which is alone in circuit.

With the master controller in the first running position, the four motors are connected in series with each other and with the external resistance $Re$. In the second running position, the external resistance is cut out by the closing of contactor R'. Between running positions 2 and 3, there is an intermediate position in which motors 3 and 4 are short circuited by the closing of the contactor F. It will be noted that the contacts $F^c$ and $G^c$, which are engaged, respectively, by the fixed contact fingers $f$ and $g$ overlap each other, and that the contact $F^c$ extends beyond the contact $G^c$. This has the effect of maintaining the short circuit just referred to until the third running position is nearly reached. In this manner, this short-circuiting period is prolonged for a sufficient interval to permit the current in the short-circuited motors to die down and thus eliminate arcing at the contacts of the switching devices when these motors are subsequently open-circuited, previously to making the series parallel connections which occur at the third running position. At this third position, the motors are connected in series parallel.

Between the third and fourth running positions, the field windings of motors 1 and 2 are weakened by the closing of the actuator $R^2$. Resistance coil $s$ is preferably inserted in this short circuit. This condition of the motor circuits is illustrated graphically at $3^a$ in Fig. 3. In passing from this temporary position to the fourth running position, the #4 motor is short-circuited, as shown at $3^b$ in Fig. 3, and the field weakening just referred to is maintained by the prolongation of the contact $R^{2c}$ and motor #4 is also short-circuited by the closing of the actuator C. It will be noted that the contacts $D^c$ and $C^c$ which are effective at this time in maintaining this circuit condition overlap each other, and that the contact $C^c$ is prolonged, whereby the maintenance of the short circuit around the #4 motor will be prolonged for a sufficient interval to permit the current in this motor to die down before it is open-circuited and reconnected in parallel with motor #3, which occurs at the fourth running position. In this position, the motors #3 and #4 are connected in parallel with each other and also in parallel with motors #1 and #2, whose fields are still short-circuited.

Intermediate the fourth and fifth running positions, there is an intermediate position $4^a$, in which the motor circuits are in the same condition as at the fourth position, except that motor #1 is short-circuited by the closing of contactor B. The short circuit interval of motor #1 is prolonged by the overlapping arrangement of the two contacts $R'^c$ and $B^c$ for the purpose above stated. At the fifth running positions, motors #1 and #2 are reconnected in parallel with each other and in parallel with motors #3 and #4, this bringing all the motors into full parallel relations.

It will be noted from Figs. 1 and 3 that the motors are so grouped that the fields of the adjacent motors of each pair are directly connected to each other, so that a single contactor R² can short circuit simultaneously either all or a portion of both fields of these motors. In Fig. 4, we have illustrated a modification in which a portion of the fields of both pairs of motors can be short-circuited through the action of contactors I² and J². A suitably modified master controller MC² is illustrated in this figure, for effecting the motor combinations illustrated in Fig. 5, and which will be readily understood without detailed description.

In Fig. 6, we have illustrated another modification, in which the fields of both pairs of motors are arranged to be short-circuited through inductive resistance I$x$, by the action of the contactors I³ J³. The motor combination effected may be the same as shown in Fig. 5, except that instead of short-circuiting a portion of the fields, the entire fields are short-circuited through the inductive resistance.

In Figs. 4 and 6, the same reference characters are employed as in Fig. 1, but in Fig. 4, the suffix "2" is added, while in Fig. 6, the suffix "3" is added. The control circuits are not illustrated in detail in Fig. 4, but it will be readily understood that the fixed controller contacts having lower case letters control, respectively, the circuits of the actuators having corresponding upper case letters, as in Fig. 2.

Fig. 3ª shows another method by which the motor fields may be weakened by short-circuiting and cutting out the windings of one or more poles. In this figure, N' and N³ are the opposite north pole field coils of #1 motor; S² S⁴ are the opposite south pole field coils of #1 motor; N⁵ N⁷ are the opposite north pole field coils of #2 motor; and S⁶ S⁸ are the opposite south pole field coils of #2 motor. W is a contactor switch which is arranged to short circuit simultaneously the two south pole field coils of #1 motor and the two north pole field coils of #2 motor. The purpose of this arrangement is to permit weakening the fields of one or more motors by the use of a single contact switch, without employing external resistance or reactance. No special field windings is required on the motors, since standard motors can be re-connected to secure this result. In the standard motors, the field coils are connected together in rotation from north to south to north to south. In our arrangement, the coils are re-connected so that the two north poles are connected in succession and then the two south poles. The wiring between the coils is made simply by turning half way around the two middle field coils S² and N³ and S⁶ and N⁷, as shown, so that opposite terminals marked plus will be at the opposite side from the similar terminals of the windings N, S⁴ and N⁵, S⁸.

This does not change the polarity of any poles, but cuts out the exciting field on two poles of each motor when the contactor W is closed. If desired, only one pole may be cut out in this manner, and in a multipolar machine more than half the poles may be cut out.

In Figs. 7, 8 and 9, we have shown another modification which is especially adapted for use under more severe accelerating conditions, as on high speed railways or where grades and loads are heavy. This arrangement differs mainly from the preceding forms by locating a resistance R$x^4$ in series between two of the motors in such a way that the resistance can be used at a number of different times during the accelerating period and may be used with different motors. For example, it may first be used in series with all four motors in the starting position; secondly, it may be used between the second and third running positions in series with the #4 motor; and third, it may be used after the fourth position in series with #3 motor only just before this motor is thrown across the line. This resistance is preferably (although not necessarily) of the inductive type, that is to say, has a reactance coil with an iron core, in order to limit the first rush of current which occurs at the transition position where it is used. It will be noted from Fig. 9 that in this arrangement, there are never less than three motors in circuit and doing useful work at one time. At the fourth position, the motors are in series parallel, but with weakened fields. During the following transition period #1 and #2 motors remain in series with weakened fields, while #3 motor is first connected in series with the inductive resistance R$x^4$ and thence across the line with full field. At the same time, the #4 motor is short-circuited. Next, the #4 motor is thrown across the line without external resistance with full field, and simultaneously the inductive resistance R$x^4$, in series with #3 motor, is short circuited. This gives the fifth position in which the two motors are in series with weakened fields and two motors are across the line with strong fields. In position 5ª, motors 2, 3, and 4 are in parallel across the line, and in position 6, all four motors are in parallel across the line.

The arrangement of the master controller on the power circuits for effecting these positions is clearly shown in Figs. 7 and 8, and need not be described in detail.

The various contactors H⁴, A⁴, B⁴, R⁴, C⁴, D⁴, R⁵, F⁴, E⁴, R⁶ and G⁴ are controlled by the contacts bearing similar reference characters, coöperating with the contacts shown on the master controller MC⁴. The arrangement of interlocks while differing slightly from that shown in Fig. 2, has substantially the same purpose in view. Other parts shown in Fig. 7 are given the same reference letter as in Fig. 2, with the numeral "4" affixed thereto.

Our invention provides a system of control in which the number of contactors is reduced to a minimum consistent with the number of operations which are performed, and in which there is very little wasteful external resistance employed. The feature of weakening the fields of motors in the manner described when passing from series to series parallel or from series parallel to full parallel relations, one or both, is a highly efficient step. The step of prolonging the short-circuited intervals of certain motors greatly reduces the arcing at the switching contacts.

It will be noted that all the circuit changes are effected without breaking a permanent series connection between the motors. The present system thus retains all the advantages set forth in the patent above referred to. Some of the features of our invention, however, are not limited to this permanent series connection of the motors.

We do not wish to limit ourselves to the particular details of circuit arrangements, interlocks, etc., which we have herein shown and described, as these may be widely varied without departing from the spirit and scope of our invention, as defined in the appended claims.

We claim:

1. In the control of a plurality of electric motors, the method of control which comprises weakening of the fields of one group of motors before increasing the voltage applied to the other group of motors and then increasing the voltage applied to such other group of motors, substantially as described.

2. In the control of electric motors, the improvement in the method of control, which comprises weakening the fields of one group of motors, then short-circuiting one motor of a second group and then open-circuiting the other motor of the second group and reconnecting said motors of the second group in a relation to increase the voltage thereon, substantially as described.

3. In the control of electric motors, the improvement in the method of control, which consists in starting with the motors in full series connection, then short-circuiting one group of motors, then reconnecting the motors in series parallel relation, then weakening the fields of one group of motors, then short-circuiting one of the motors of the other group, then reconnecting the motors of the last named group in parallel while maintaining the motors of the first named group in series with their fields weakened, then short-circuiting a motor of the first named group while simultaneously restoring the field strength of said motors, and then reconnecting the motors of the first named group in parallel with each other and in parallel with the already parallel-connected motors of the second group, substantially as described.

4. In the control of a plurality of electric motors, the improvement which consists in short-circuiting one or more of the motors preparatory to establishing new circuit relations in the same, and prolonging the short-circuited interval for a sufficient period to permit the current therein to dissipate, substantially as described.

5. In the control of a plurality of electric motors, the improvement which consists in operating some of the motors in series with weakened fields, and some of the motors across the line with all their field poles fully excited, substantially as described.

6. The combination with a plurality of electric motors, of switch mechanism for effecting the short-circuiting of some of the motors, said switching mechanism having contact devices arranged to prolong the short-circuited interval of the short-circuited motor or motors, substantially as described.

7. The combination with a plurality of electric motors having permanent series connections, of switch mechanism for changing the motors from series to series parallel relation and from series parallel to full parallel relation and also having means for weakening the fields of one group of motors before increasing the voltage on the other group of motors, substantially as described.

8. The combination with a plurality of electric motors having permanent series connections, of switch mechanism for changing the motors from series to series parallel relation and from series parallel to full parallel relation and also having means for weakening the fields of one group of motors before increasing the voltage on the other group of motors, and still other means for short-circuiting one of the motors of the second group before increasing the voltage thereon and while the motors of the first named group have their fields still partially short-circuited, substantially as described.

In testimony whereof, we have hereunto set our hands.

PEARL N. JONES.
    JAMES W. WELSH.

Witnesses:
 GEO. K. McGUNNEGLE,
 R. A. BALDERSON.